(12) United States Patent
Hermann

(10) Patent No.: US 9,527,019 B2
(45) Date of Patent: Dec. 27, 2016

(54) FILTER PLATE COMPRISING A TEMPERATURE CONTROL BODY AND FILTER CARTRIDGE COMPRISING SUCH A FILTER PLATE

(75) Inventor: Manfred P. Hermann, Nürnberg (DE)

(73) Assignee: JVK Filtration Systems GmbH, Georgensgmund (DE)

( * ) Notice: Subject to any disclaimer, the term of this patent is extended or adjusted under 35 U.S.C. 154(b) by 1013 days.

(21) Appl. No.: 13/505,117

(22) PCT Filed: Oct. 29, 2010

(86) PCT No.: PCT/EP2010/066440
§ 371 (c)(1),
(2), (4) Date: Jul. 16, 2012

(87) PCT Pub. No.: WO2011/051428
PCT Pub. Date: May 5, 2011

(65) Prior Publication Data
US 2012/0285871 A1    Nov. 15, 2012

(30) Foreign Application Priority Data
Oct. 30, 2009  (DE) ............... 20 2009 014 692 U

(51) Int. Cl.
| | | |
|---|---|---|
| B01D 25/12 | (2006.01) | |
| B01D 25/164 | (2006.01) | |
| B01D 25/176 | (2006.01) | |
| B01D 25/21 | (2006.01) | |

(Continued)

(52) U.S. Cl.
CPC ............ *B01D 35/18* (2013.01); *B01D 25/122* (2013.01); *B01D 25/164* (2013.01); *B01D 25/176* (2013.01); *B01D 25/215* (2013.01); *B01D 25/284* (2013.01)

(58) Field of Classification Search
CPC ....... B01D 35/18; B01D 25/008; B01D 25/12; B01D 25/122; B01D 25/164; B01D 25/176; B01D 25/215; B01D 25/284; B01D 33/0183
See application file for complete search history.

(56) References Cited

U.S. PATENT DOCUMENTS

| | | | |
|---|---|---|---|
| 5,051,179 A | 9/1991 | Hermann | 210/228 |
| 7,156,993 B2 | 1/2007 | Hermann et al. | 210/231 |
| 7,790,027 B2 | 9/2010 | Hermann | 210/228 |

(Continued)

FOREIGN PATENT DOCUMENTS

| | | | |
|---|---|---|---|
| DE | 590710 | 1/1934 | ............ B01D 25/21 |
| DE | 3713419 | 11/1988 | ........... B01D 25/164 |

(Continued)

OTHER PUBLICATIONS

Translation of Gao TW 288020B from TIPO (accessed on Sep. 9, 2014).*

(Continued)

*Primary Examiner* — Lucas Stelling
(74) *Attorney, Agent, or Firm* — Kusner & Jaffe

(57) ABSTRACT

A filter plate having a basic body and an elastic element which is fastened to the basic body in an annular and liquid-tight manner. The filter plate is distinguished by the fact that a temperature-control plate is fastened to the elastic element.

21 Claims, 6 Drawing Sheets

(51) Int. Cl.
    *B01D 25/28*    (2006.01)
    *B01D 35/18*    (2006.01)

(56) References Cited

U.S. PATENT DOCUMENTS

| | | | |
|---|---|---|---|
| 8,022,338 B2 | 9/2011 | Kuffel et al. | 219/530 |
| 2008/0087593 A1 | 4/2008 | Hermann | 210/228 |
| 2008/0190831 A1 | 8/2008 | Marchek | 210/231 |
| 2008/0277330 A1 | 11/2008 | Esser et al. | 210/225 |

FOREIGN PATENT DOCUMENTS

| | | | | |
|---|---|---|---|---|
| DE | 200 06 891 | 7/2000 | | B01D 25/12 |
| DE | 202005006681 | 8/2006 | | B01D 25/168 |
| EP | 0 357 015 | 3/1990 | | B01D 25/168 |
| EP | 0676225 | 10/1995 | | B01D 25/12 |
| EP | 1654048 | 5/2006 | | B01D 25/164 |
| GB | 346191 | 4/1931 | | B01D 25/21 |
| TW | 288020 | 10/2007 | | B01D 25/168 |
| WO | WO 03/095063 | 11/2003 | | B01D 25/21 |
| WO | WO 2004/024290 | 3/2004 | | B01D 25/21 |
| WO | WO 2005/016487 | 2/2005 | | B01D 25/12 |
| WO | WO 2006/089662 | 8/2006 | | B01D 25/21 |
| WO | WO 2006/111379 | 10/2006 | | B01D 25/21 |

OTHER PUBLICATIONS

Translation of Aigeldinger et al. EP0676225A1 from Espacenet (accessed on Dec. 22, 2014).*
Definition of word "fasten" from Dictionary.com, based on the Random House Dictionary, 2015, accessed on Jul. 24, 2015.*
English translation of Gao, TW 288020B. (2007).

* cited by examiner

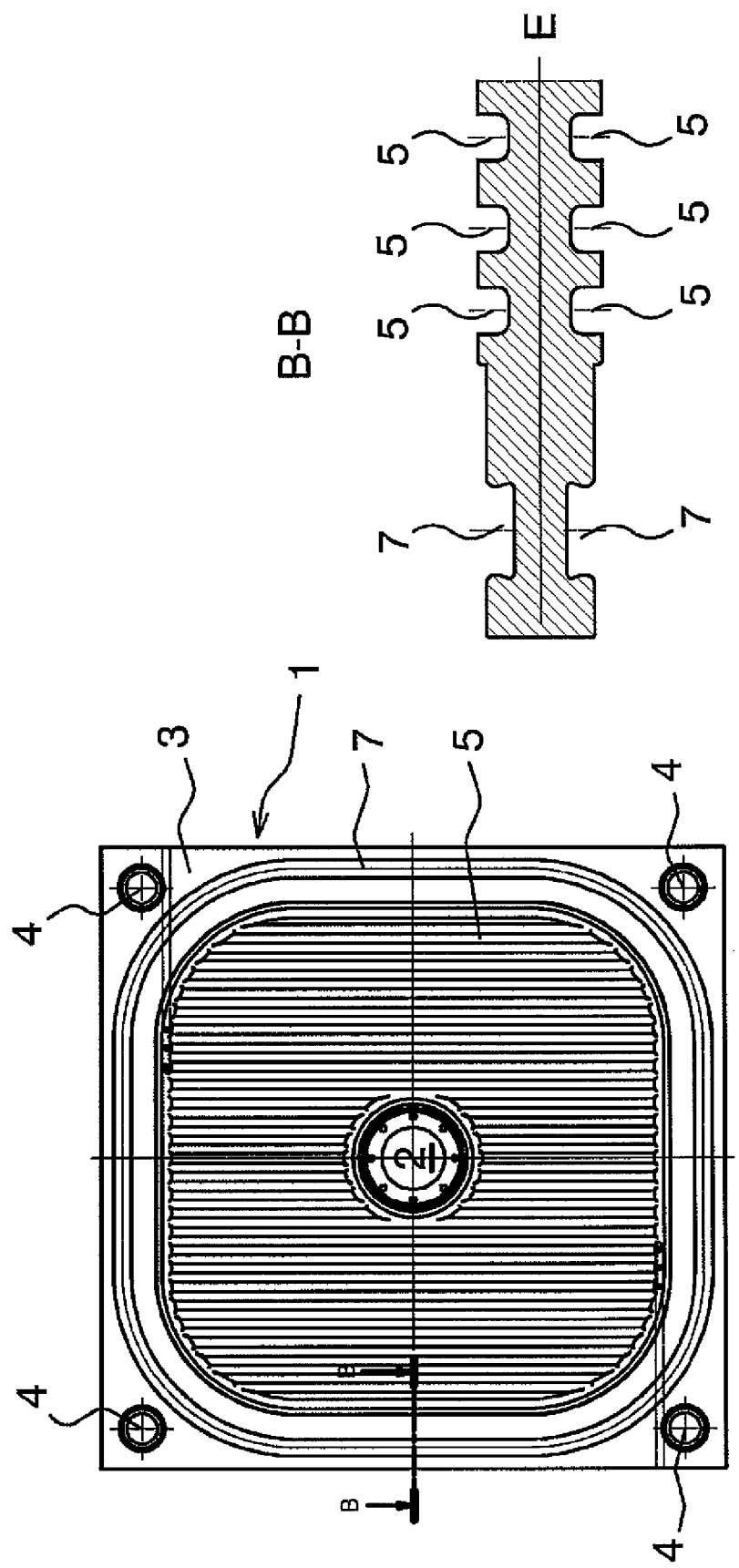

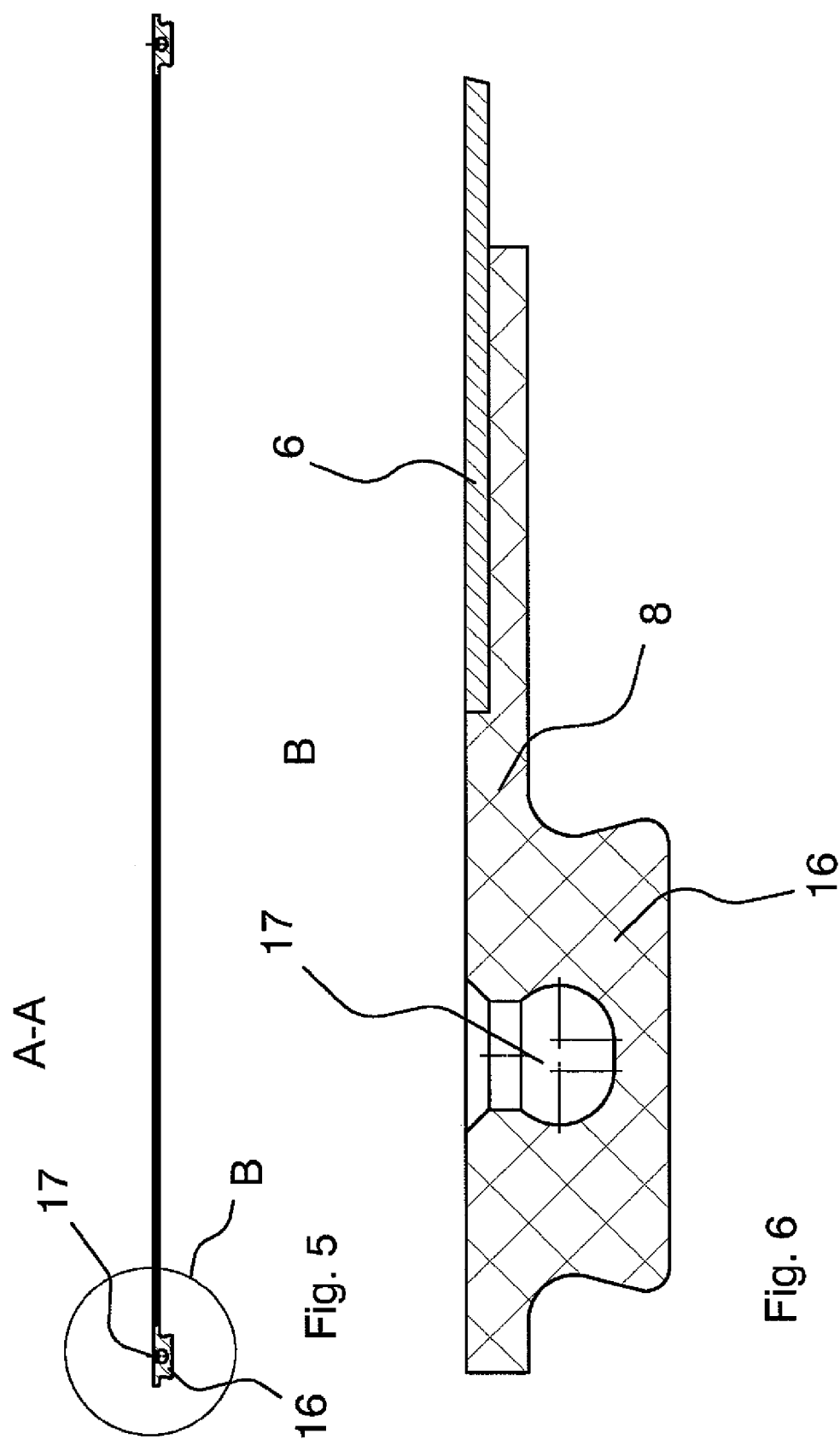

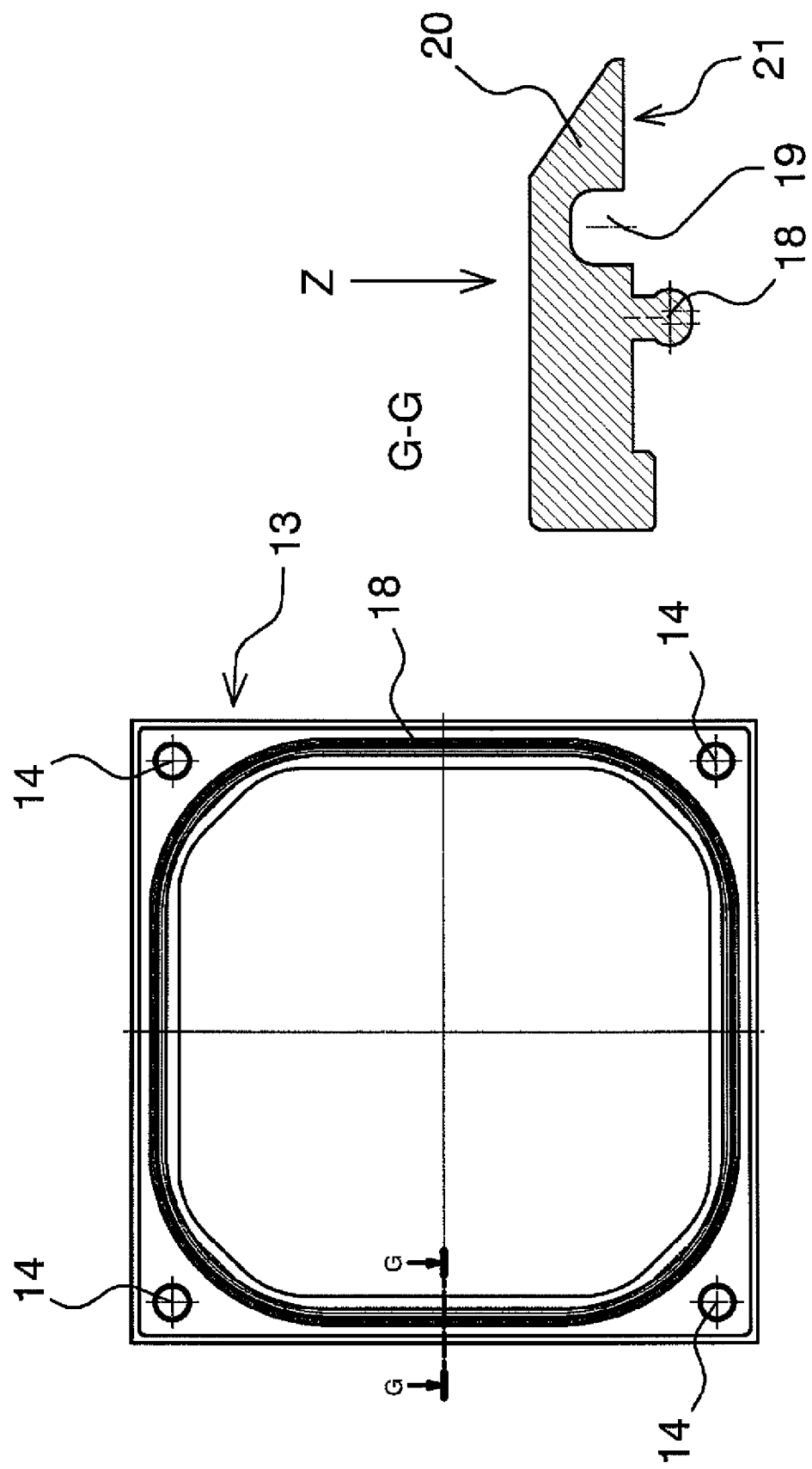

FILTER PLATE COMPRISING A TEMPERATURE CONTROL BODY AND FILTER CARTRIDGE COMPRISING SUCH A FILTER PLATE

FIELD OF THE INVENTION

The present invention relates to a filter plate having a basic body and an elastic element which is fastened to the basic body in an annular and liquid-tight manner. Furthermore, the invention relates to a filter assembly having a plurality of filter plates.

BACKGROUND OF THE INVENTION

For a filter press, it is known to form a filter assembly which consists of a plurality of filter plates arranged alongside one another in pairs. Filter chambers are in each case formed between the filter plates. For this purpose, the filter plates have a central filter area and a sealing rim bordering the central filter area. In the filter press, the filter plates can be moved away from and toward one another, as a result of which the filter chambers can be opened and closed.

Each filter chamber usually has an inlet and an outlet. The suspension to be filtered, which is usually designated pulp, flows into the filter chamber via the inlet. The suspension is then filtered by means of a filter cloth, with the solids being held back in the filter chamber by the filter cloth, resulting in the production of what is known as a filter cake. The filtrate freed of the solids is passed out of the filter chamber via the outlet.

In order to reduce the residual moisture in the filter cake and to shorten the filtration times, there are known filter presses in which at least one filter plate of a filter chamber has a diaphragm. Such a filter plate is known as a diaphragm filter plate. In a filter press having diaphragm filter plates, the pressure filtration initially carried out is followed by press filtration, in which the elastic diaphragms of the filter chambers are subjected to a pressure medium, as a result of which they expand and constrict the space in which the filter cake is located. In this way, the filter cake is compressed, and as a result the residual moisture in the cavities of the filter cake is reduced further.

Diaphragm filter plates for filter presses are described for example in EP 0 357 015 B1 and WO 03/095063 A1.

In order to reduce the residual moisture from the filter cake even further, it is known to heat the filter cake. In the case of any further processing of the filter cake, too, it is important to obtain a filter cake having as little residual moisture as possible.

Filter presses in which the material to be filtered is dried have already been known for a long time. DE 590710 describes a filter press in which the material to be filtered is dried by a heating plate. In that document, the starting point is a filter press in which the heating plates are clamped between the frames of the filter press. However, such an arrangement has the disadvantage that reliable sealing is particularly difficult because the heating plates expand during heating. For this reason, DE 590710 proposes forming the heating plates separately from the filter press frame as self-contained heating elements which are installed in a self-supporting manner in the filter frames, as a result of which the residues to be dried are in contact with the heating plate on all sides.

DE 37 13 419 C2 discloses a further method and a further apparatus for drying a filter cake in a filter press. In this case, the filter cake is heated by heating up the rubber diaphragm by subjecting it to heated compressed air. Furthermore, the filter cake itself can be heated by an electric current which flows from electrodes on one diaphragm to electrodes on an opposite diaphragm.

Furthermore, WO 2006/111379 A1 discloses a heatable and coolable filter plate. When this filter plate is used in a filter press, the diaphragm is arranged between the filter chamber and a diaphragm chamber. The diaphragm chamber is bounded on one side by the diaphragm and on the other side by a plastics basic body. This basic body also has grooves, and as a result the thickness of the basic body with respect to the adjacent filter chamber is relatively small. A heated fluid is passed into the diaphragm chamber. In this way, the filter cake in the filter chamber can be heated through the diaphragm. On the other hand, the filter cake in the adjacent filter chamber can also be heated through the basic body, since heat transfer is possible in particular in the regions having a smaller wall thickness in the grooves.

In order to achieve even better heat transfer from a temperature-control element to the filter cake, it has been proposed to form the temperature-control element from metal. WO 2004/024290 A1 describes, for example, a filter press having a metal heating plate, which is screwed onto a plastics frame. In U.S. 2008/0190831 A1, the heating plates are firmly clamped between a basic body and a screwed-on cover plate. WO 2006/089662 A1 describes a temperature-controllable filter plate, in which at least two corrugated elements, which are connected together, are used as heating or cooling body, said elements forming a cavity, through which a temperature-controllable medium can flow. The heating or cooling body is rigidly connected to a frame in a manner spaced apart from the frame via crosspieces or bolts.

Furthermore, DE 200 06 891 U1 discloses a heating element for a filter press which comprises a plurality of diaphragm filter elements and heating elements which are arranged in an alternating manner in rows and are clamped in a press frame. The heating element comprises a basic body which is closed in a sealed manner on both sides by a respective metal plate, such that branching heating-medium channels are produced.

In the case of filter plates in which a metal heating element is rigidly connected to a plastics frame, the problem arises that when the filter plates are used in a filter press, leaks frequently occur or stresses in and bending of the system composed of the heating element and the frame occur. The reason for this resides in the extremely different coefficients of thermal expansion of metal and plastics material. When the heating element is heated, it expands much less than the plastics frame. In the long run, this causes relative displacements between the heating element and the frame, which lead to the sealing elements being damaged.

In order to solve this problem, EP 0 676 225 A1 proposes forming the filter press entirely from metal, with the plates then being connected peripherally to an associated frame by weld seams. However, such filter plates are very expensive.

Further, EP 1 654 048 B1 proposed fastening two metal heating plates to a basic body via a central hole and a flange. By way of this type of fastening, it is possible for the heating plate to thermally expand largely independently of the basic body without causing tension between the basic body and the heating plate.

SUMMARY OF THE INVENTION

The present invention is based on the object of providing a filter plate of the type mentioned at the beginning and a filter assembly having such a filter plate, by way of which filter plate and filter assembly a filter cake can be temperature-controlled when used in a filter press, with no leakages or tension occurring during the temperature-control.

According to the invention, this object is achieved by a filter plate having the features of claim 1 and a filter assembly having the features of claim 15. Advantageous refinements and developments can be gathered from the dependent claims.

The filter plate according to the invention is distinguished by the fact that a temperature-control plate is fastened to the elastic element. By fastening the temperature-control plate to the basic body via the elastic element, the temperature-control plate can expand or contract freely during temperature changes, independently of the basic body. The changes in the geometry of the temperature-control plate and/or of the basic body are compensated fully by the elastic element. In particular, no tension can occur between the temperature-control plate and other rigid bodies which have a different coefficient of thermal expansion than the temperature-control plate.

The temperature-control plate is, in particular, fastened to the elastic element such that forces exerted only by the elastic element counteract a thermal change in size of the temperature-control plate. However, the elastic element is formed such that it can easily compensate the thermal changes in size of the temperature-control plate, without tension or leakages arising. Furthermore, thermal changes in size of the basic element also have no effect on the temperature-control plate. Such changes in size are also compensated by the elastic element.

According to one refinement of the filter plate according to the invention, the temperature-control plate is retained on the elastic element in a manner spaced apart from the basic body in the direction of the plate plane. By contrast, the temperature-control plate can come into contact with the basic body or another body in a direction perpendicular to the plate plane, i.e. in the direction normal to the plate, since the thermal expansion is only very low in this direction.

The elastic element can form a continuous surface on which the temperature-control plate is retained. However, since in this case heat or lines for a temperature-control medium have to pass through the elastic element, the elastic element is preferably formed in an annular manner. Inside the annular elastic element, the temperature-control plate is fastened to the elastic element in a liquid-tight manner. It is also retained by the elastic element. Thus, the basic body is closed in a liquid-tight manner by the elastic element and the temperature-control plate, and so when the filter plate is used in a filter press, a filter chamber can be formed by the unit formed from the elastic element and the temperature-control plate.

Further elements can, if appropriate, also be fitted inside the temperature-control plate. These are fastened in the temperature-control plate, in particular in a liquid-tight manner, such that thermal expansion of the temperature-control plate is not impeded by such an element. For example, supporting bosses can be fastened inside the temperature-control plate. Further, a pulp hole can be fastened in a liquid-tight manner in the temperature-control plate.

According to one refinement of the filter plate according to the invention, the elastic element is fastened to the basic body by means of a snap connection. To this end, the basic body has for example an annular groove, in which the elastic element is clamped. In order to clamp the elastic element in the groove in the basic body, there may be provided a cover frame which has a protrusion that snaps into the groove in the basic body and in the process clamps the elastic element between the basic body and the cover frame. Conversely, the basic body could also have the protrusion and the groove could be formed in the cover frame. In order to fasten the elastic element in the groove in the basic body or in a groove in a cover frame, it may have a dovetailed peripheral bead, the shape of which corresponds to the shape of the groove, such that it can be inserted easily into the groove. The dovetailed peripheral bead can also have a recess, the shape of which corresponds to the shape of the protrusion on the cover frame or on the basic body, such that the protrusion can be introduced into the recess in the elastic element when the peripheral bead is located in the groove. What is advantageous about fastening the elastic element by means of a snap connection is that the elastic element having the temperature-control plate can be exchanged quickly and easily. The assembly outlay is very low with such an exchange.

According to another refinement of the filter plate according to the invention, the elastic element is fastened to the basic body by means of a screw connection. In this case, too, the elastic element having the temperature-control plate is exchangeable, but the assembly outlay is higher than when the elastic element is fastened by means of a snap connection.

According to a further refinement of the filter plate according to the invention, the elastic element is fastened to the basic body by means of a welded connection. The elastic element is welded in particular into the basic body or welded onto the basic body. This type of fastening has the advantage that the assembly outlay is lower than fastening by way of a screw connection. However, in this case, the elastic element having the temperature-control plate is not exchangeable.

The temperature-control plate is comprised in particular of a heat-conducting material. It may be comprised for example of a metal or of a heat-conducting plastics material, for example a heat-conducting polymer, or a combination thereof. In this way, very good heat transfer from the temperature-control plate to a filter cake can be produced. Since, furthermore, the temperature-control plate is fastened flexibly to the basic body via the elastic element, the temperature-control plate can be pressed against the filter cake during drying and can also remain in contact with the filter cake when the latter shrinks. The elastic element can thus not only compensate thermal changes in size of the temperature-control plate in the plate plane, it also allows a movement of the temperature-control plate in the direction normal to the plate. Thus, throughout the drying operation, very good heat transfer can be produced between the temperature-control plate and the filter cake. In addition, breakage of the filter cake during drying can be prevented. Breakage of the filter cake is disadvantageous, since, as a result, a vacuum applied during drying can break down, as a result of which further drying is considerably impaired or prevented.

According to a further refinement of the filter plate according to the invention, at least one surface of the temperature-control plate is structured. The structured surface of the temperature-control plate is, in particular, that side of the temperature-control plate which faces the filter cake when used in a filter press. In this case, in particular channels are formed on this surface of the temperature-control plate. The residual moisture can escape via these channels as liquid or steam during the drying of the filter cake. The channels can be formed for example by a wire grid which is arranged on the surface of the temperature-control plate. Further, the channels can be formed by profiling of the surface of the temperature-control plate.

The elastic element and the temperature-control plate of the filter plate according to the invention can form a diaphragm, such that a diaphragm filter plate is provided. Thus, by way of this diaphragm, the filter cake can not only be compressed but also temperature-controlled, in particular heated.

The basic body of the filter plate according to the invention in particular is comprised of a plastics material, for example of polypropylene. By way of this refinement, the filter plate can be produced in a cost-effective manner. A plastics basic body also has the advantage that it is a thermal insulator. Therefore, radiation of heat toward the outside is avoided. Furthermore, the plastics material heats up only a little. In fact, excessive heating of the plastics material would have the disadvantage that leakages could occur at the sealing rim. Furthermore, the strength of the plastics material decreases if it is heated excessively. As a result, the maximum pressure which could be exerted on the filter plate when used in a filter press would be reduced.

The filter assembly according to the invention comprises a plurality of filter plates. At least one of the filter plates is formed like the above-described filter plate according to the invention. In the filter assembly, a filter chamber is formed on one side of the unit formed from the elastic element and the temperature-control plate. Further, a temperature-control unit for temperature-controlling the temperature-control plate is provided. In the filter assembly, in particular every second filter plate can be formed as a diaphragm. The diaphragm can be formed for example by the elastic element and the temperature-control plate fastened thereto. However, in the filter assembly, the filter chamber is preferably bounded on one side by the filter plate according to the invention and on the other side by a diaphragm filter plate known per se.

The temperature-control plate can be for example electrically heatable. According to another refinement, the temperature-control plate can be subjected to a temperature-control medium from the other side of the unit formed from the elastic element and the temperature-control plate, i.e. from the side remote from the filter chamber. Finally, the temperature-control plate can also have temperature-control channels, through which a temperature-control medium can be passed.

BRIEF DESCRIPTION OF THE DRAWINGS

The invention will now be explained by way of an exemplary embodiment with reference to the drawings.

FIG. 2 shows a plan view of the basic body of the exemplary embodiment of the filter plate according to the invention, FIG. 3 shows the section B-B through the basic body shown in FIG. 2, FIG. 5 shows the section A-A through the unit shown in FIG. 4, FIG. 6 shows the detail B of the section shown in FIG. 5, FIG. 7 shows a plan view of the cover frame of the exemplary embodiment of the filter plate according to the invention, FIG. 8 shows the section G-G through the cover frame shown in FIG. 7.

DETAILED DESCRIPTION OF THE INVENTION

Figure 1:
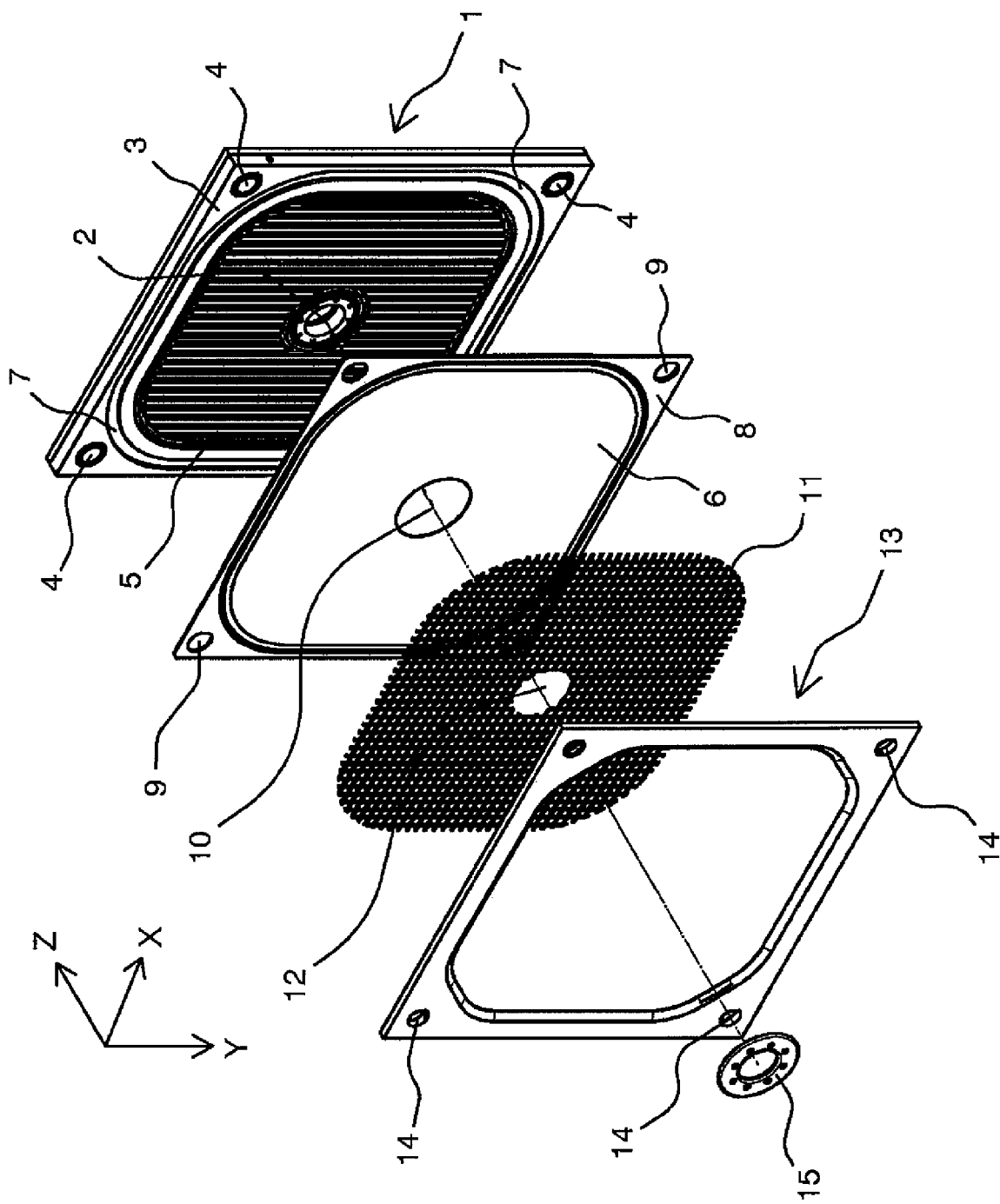
FIG. 1 shows an exploded view of the structure of an exemplary embodiment of the filter plate according to the invention.

FIG. 1 illustrates the basic structure of the multipart filter plate. The filter plate comprises a basic body 1. The basic body 1 has a central filtrate introduction hole 2 and, in the peripheral region 3, corner holes 4, via which the filtrate is discharged. In the peripheral region 3 there is also formed an annularly circumferential fastening groove 7. Furthermore, distribution channels 5, through which a temperature-control medium can flow, are formed on that surface of the basic body 1 which faces the temperature-control plate 6. Instead of the channels or flutes 5 shown in FIGS. 1 and 2, the basic body 1 could also have a studded surface so that the temperature-control medium can be distributed quickly in all directions.

The basic body 1 is adjoined by a unit formed from an elastic element 8 and the temperature-control plate 6. The elastic element 8 is comprised for example of an elastomer. It forms in particular a ring and—as will be explained in detail later—is fastened to the basic body 1 in a liquid-tight manner at the fastening groove 7.

The temperature-control plate 6 is fastened to the elastic element 8 inside the ring of the elastic element 8. It is retained by this element 8 such that it can move in the direction of the plate plane, which is defined by the vectors X and Y. In the event of a movement or a change in size of the temperature-control plate 6 in the X-Y plane, initially only forces which are exerted by the elastic element 8 act on the temperature-control plate 6. The temperature-control plate 6 is retained in a manner spaced apart from the basic body 1, in particular in the X-Y plane. The thermal expansion of the temperature-control plate 6 is thus not impeded by the fastening of the temperature-control plate 6 to the basic body 1, since said thermal expansion is compensated by the elastic element 8.

The temperature-control plate 6 is comprised of a heat-conducting material, in particular of a material that conducts heat very well, such as metal or a plastics material having high heat conduction, for example. The temperature-control plate 6 is connected to the elastic element 8 in a liquid-tight manner around the entire circumference. If the elastic element 8 is comprised of an elastomer and the temperature-control plate 6 is comprised of metal, the temperature-control plate 6 can be fastened for example via what is known as a rubber-metal connection. Within the annular peripheral fastening groove 7, a liquid-tight region is thus closed on one side of the basic body 1 by the elastic element 8 and the temperature-control plate 6.

Outside the circumferential fastening to the basic body 1, the elastic element 8 has corner holes 9 which correspond to the corner holes 4 in the basic body 1. Furthermore, a central hole 10 can be provided in the temperature-control plate 6, said central hole 10 corresponding to the filtrate introduction hole 2 in the basic body 1.

On that surface of the temperature-control plate 6 which is remote from the basic body 1, a grid 11 is arranged on the temperature-control plate 6. However, the grid 11 is fastened such that it does not impede thermal expansion or thermal contraction of the temperature-control plate 6 in the X-Y plane. Channels, via which residual moisture can be discharged during the drying of a filter cake in a filter press, are formed by the grid 11. The grid 11, too, has a central hole 12, through which a filtrate introduction channel can pass. Instead of the grid 11, the surface of the temperature-control plate 6 can also be structure or profiled, so that channels for discharging the residual moisture are formed thereby. It is important that the channels for discharging the residual moisture have a sufficiently large cross section. If the residual moisture is discharged in the form of steam, early condensation within the channels can be prevented thereby. Sufficiently large outflow cross sections can be realized readily by the grid 11 or the structuring or profiling of the surface of the temperature-control plate 6.

In order to fasten the elastic element 8 to the basic body 1, a cover frame 13 can optionally be provided. The cover frame 13, too, has corner holes 14, which correspond to the holes 9 in the elastic element 8 and the holes 4 in the basic body 1. Finally, there can be provided a support ring 15, which passes through the holes 12 and 10 and is fastened to the filtrate introduction hole 2 in the basic body 1.

A channel passes through the middle of the assembled filter plate, said channel being formed by the holes 2, 10 and 12. The temperature-control plate 6 is sealed off from this channel in a liquid-tight manner. For example, conventional sealing rings can be used in this central region, since they would not impede the thermal expansion of the temperature-control plates 6 in the radial direction. According to another refinement, the inner rim of the hole 10 in the temperature-control plate 6 is connected to the central channel via a further elastic element (not shown), specifically in the same way as the temperature-control plate 6 is fastened to the basic body 1 at the outer rim by means of the elastic element 8. Furthermore, it is possible for the basic body 1, the temperature-control plate 6 and the optionally provided grid 11 not to have central holes and for the suspension to be filtered to be introduced via the peripheral region 3.

FIG. 2 shows a plan view of the basic body 1; FIG. 3 shows the section B-B through FIG. 2, illustrating the region on both sides of the fastening groove 7. As can be seen from FIG. 3, the basic body 1 is formed in a symmetrical manner with respect to a central plane E. In a filter assembly, the elastic element 8 can be fastened to the temperature-control plate 6 on one side of the basic body 1. On the other side of the basic body 1, either again the elastic element 8 or a conventional diaphragm of a diaphragm filter plate can be fastened to the temperature-control plate 6.

Figure 4:
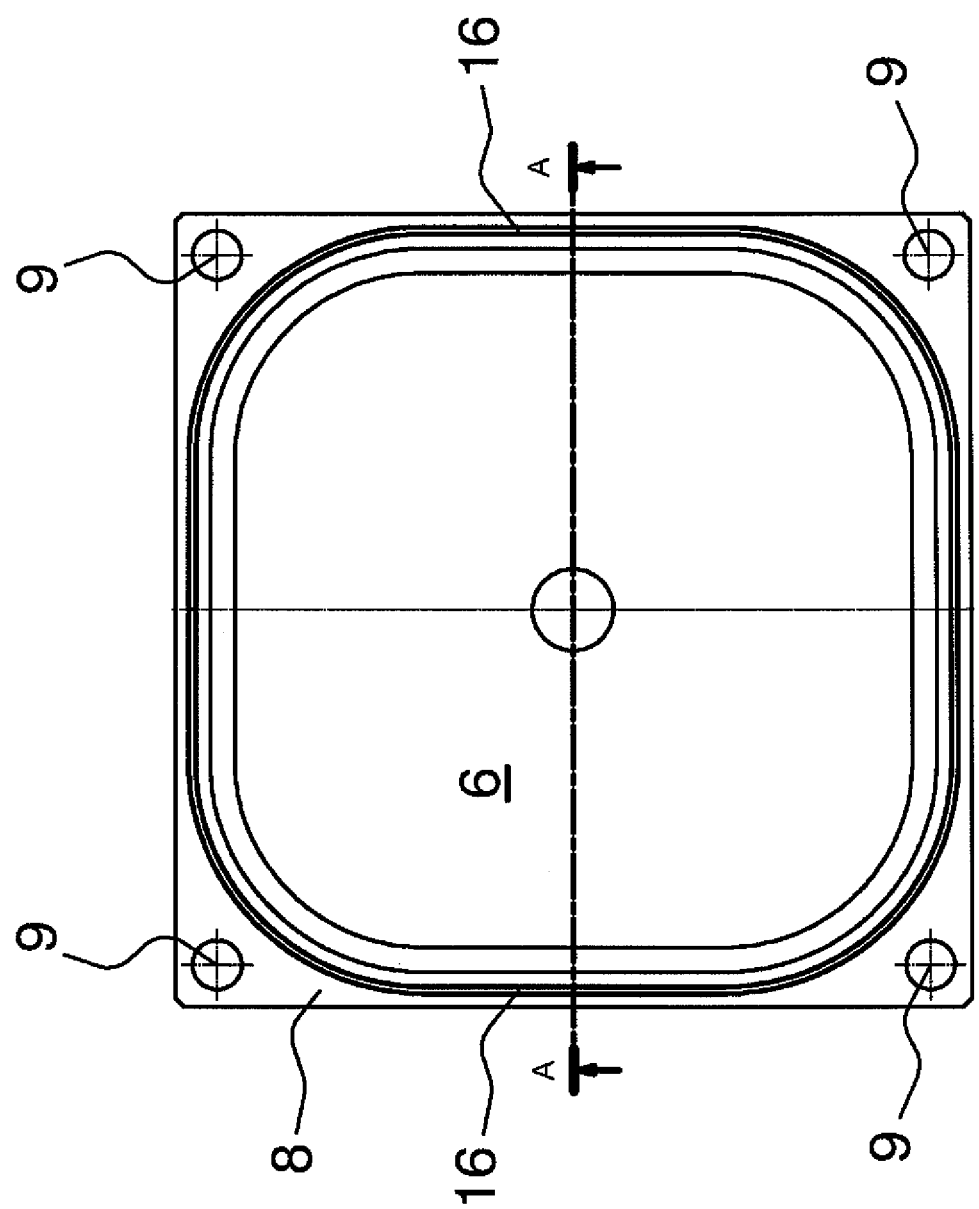
FIG. 4 shows the unit formed from an elastic element and the temperature-control plate of the exemplary embodiment of the filter plate according to the invention.

FIG. 4 shows a plan view of the unit formed by the elastic element 8 and the temperature-control plate 6; FIG. 5 shows the section A-A through the unit shown in FIG. 4 and FIG. 6 shows the detail B from FIG. 5. As can be seen in particular from FIG. 6, the elastic element 8 has a peripheral bead 16. This peripheral bead 16 is formed in the manner of a dovetail. The shape corresponds to the shape of the fastening groove 7 in the basic body 1 (see FIG. 3). The peripheral bead 16 can thus be introduced into the circumferential fastening groove 7. Furthermore, a recess 17 is formed within the dovetailed peripheral bead 16, said recess 17 making this region of the elastic element 8 elastically deformable and thus easy to insert into the fastening groove 7. A protrusion 18 of the cover frame 13 can engage in the recess 17 and in this way produce a snap connection between the cover frame 13 and the basic body 1, with the elastic element 8 being fastened in the annularly peripheral fastening groove 7 in a liquid-tight manner as a result.

FIG. 7 shows a plan view of the cover frame 13 and FIG. 8 shows the section G-G through the cover frame 13 shown in FIG. 7. The protrusion 18, which engages in the recess 17 in the peripheral bead 16 of the elastic element 8 during the fastening of the elastic element 8, can be seen in particular in FIG. 8. Furthermore, an outflow channel 19 is formed radially inwardly from the protrusion 18. The filtrate can be guided to the holes 14, 9, 4 via the outflow channel 19, and can flow out via said holes 14, 9, 4. Furthermore, the cover plate 13 has a circumferential nose 20, which, by way of the surface 21, forms a stop for the temperature-control plate 6 in the negative Z direction, i.e. in the direction normal to the temperature-control plate 6.

Figure 10:
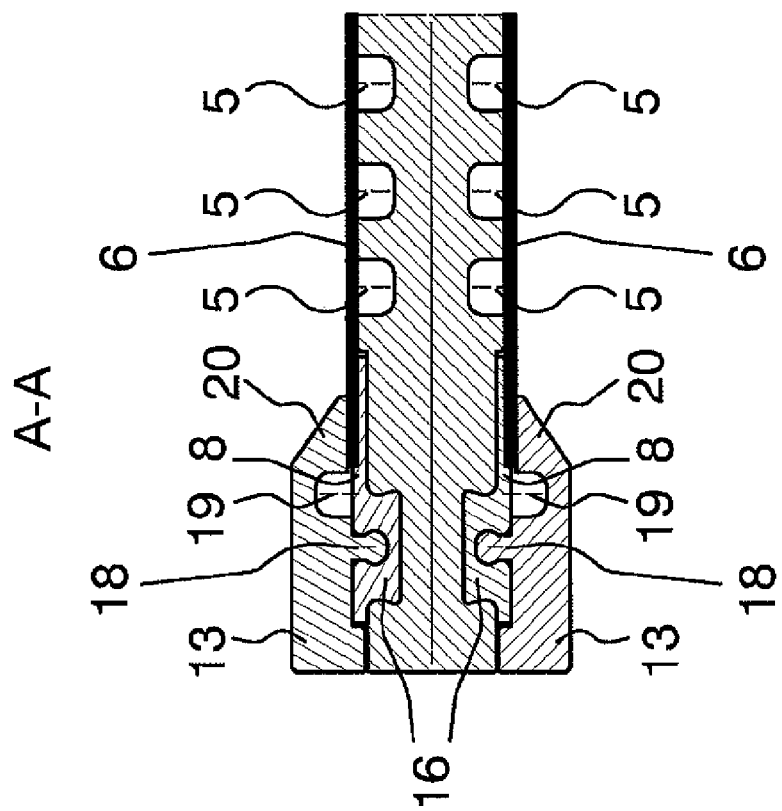
FIG. 10 shows the section A-A through the filter plate shown in FIG. 9.
Figure 9:
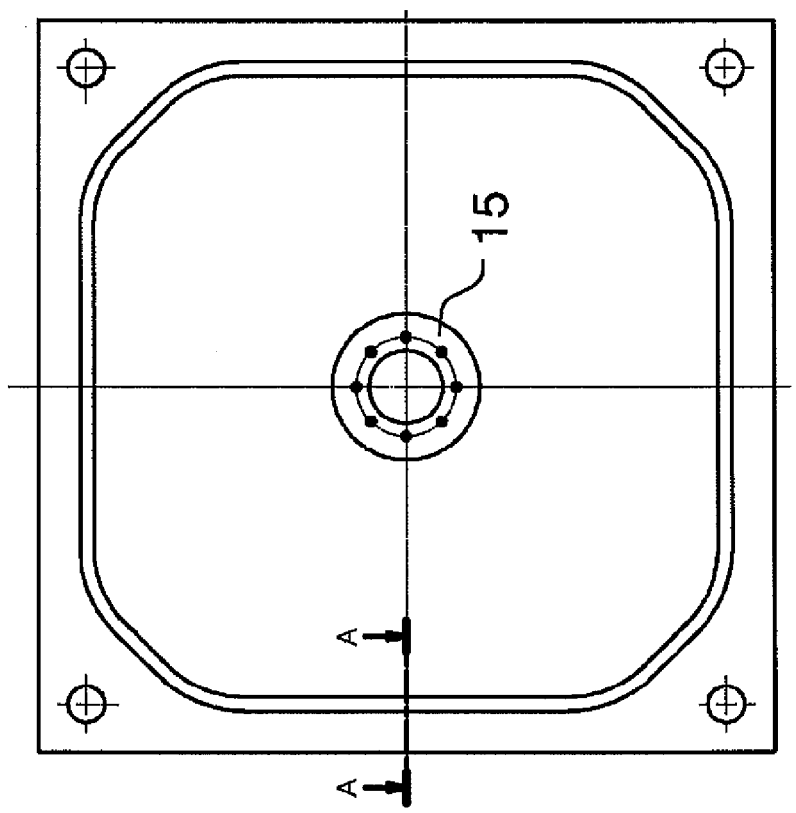
FIG. 9 shows a plan view of the assembled filter plate of the exemplary embodiment.

FIG. 9 shows a plan view of the assembled filter plate and FIG. 10 shows the section A-A through the filter plate shown in FIG. 9. The fastening of the elastic element 8 to the basic body 1 can be seen particularly well in FIG. 10. The dovetailed peripheral bead 16 of the elastic element 8 is received in the fastening groove 7 of the basic body 1. At the same time, the protrusion 18 of the cover frame 13 engages in the recess 17 in the peripheral bead 16 of the elastic element 8, such that the peripheral bead 16 is clamped in the fastening groove 7. At the same time, a snap connection is produced by the peripheral bead 18 and the fastening groove 7. The sizes and shapes of the protrusion 18, the peripheral bead 16 and the fastening groove 7 are only matched to one another such that parts slide into one another under light pressure and then lock in this position, the connection being produced thereby being liquid-tight.

It can also be seen in FIG. 10 that the temperature-control plate 6 comes into contact with the surface of the basic body 1 on one side. In the peripheral region, i.e. in that region at which it is connected to the elastic element 8, it also butts against the stop 21 (see FIG. 8) of the nose 20 of the cover frame 13. In this configuration, a movement of the temperature-control plate 6 away from the basic body 1, i.e. in the direction normal to the plate 6 (the Z direction), is thus prevented. However, it is noted that although the temperature-control plate 6 comes into contact with the basic body 1 and optionally also the cover frame 13 in the normal direction, in the direction of the plate plane, i.e. the X-Y plane, it is spaced apart from the basic body 1 and also from the cover frame 13 to which the elastic element 8 is fastened. Thermal expansion of the temperature-control plate 6 thus leads neither to leakages at the fastening to the basic body 1 nor to tension or deformation of parts of the filter plate.

On the side of the temperature-control plate 6 remote from the basic body 1, the filter cloth (not shown) for the filter plate is arranged. It may be clamped for example between the temperature-control plate 6 or the elastic element 8 on one side and the stop 21 on the nose 20 of the cover frame 13 on the other side. On that side of the filter cloth which is remote from the temperature-control plate 6, a filter chamber 22 is thus formed. Starting from the side of the filter chamber 22, first of all the filter cloth, then (optionally) the grid 11, then the elastic element 8 or the temperature-control plate 6 and finally the basic body 1 is arranged.

A temperature-control medium can flow through the distribution channels 5 in the basic body 1. Said temperature-control medium is in direct contact with the temperature-control plate 6. Since the temperature-control plate 6 has a very high coefficient of thermal conductivity, it can emit the heat supplied for example via the temperature-control medium very well to a filter cake which is located in the filter chamber 22.

In a different configuration, the temperature-control plate 6 could also be electrically heated. Further, temperature-control channels, through which the temperature-control medium can be passed, could be formed inside the temperature-control plate 6.

In a filter press, a plurality of filter assemblies as shown in FIGS. 9 and 10 are joined together, in order in this way to from a multiplicity of filter chambers 22. Once the suspension supplied via the filtrate introduction hole 2 has been filtered and has flowed out via the outflow channel formed by the corner holes 4, 9 and 14, the remaining filter cake can be dried by means of the temperature-control plate 6.

Alternatively, one filter plate of the filter assembly can be formed as a diaphragm filter plate. In this case, a diaphragm is fastened in a manner known per se for example to one side of the basic body 1, as is described in EP 0 357 015 B1 for example. Furthermore, the unit formed by the elastic element 8 and the temperature-control plate 6 can also be formed as a diaphragm. For this purpose, the elastic element 8 can be formed in a wider manner in the radial direction, and the radius of the temperature-control plate 6 would then be smaller, so that the temperature-control plate 6 no longer butts against the surface 21 of the nose 20. It would then be possible to move the temperature-control plate 6 away from the basic body 1 in the Z direction. A pressure medium, which can act simultaneously as a temperature-control medium, could then be supplied via the distribution channels 5, in order to press the temperature-control plate 6 against the filter cake.

LIST OF REFERENCE SIGNS

1 Basic body
2 Filtrate introduction hole
3 Peripheral region
4 Corner holes
5 Distribution channels
6 Temperature-control plate
7 Fastening groove
8 Elastic element
9 Corner holes in the elastic element
10 Central hole in the temperature-control plate
11 Grid
12 Central hole in the grid
13 Cover frame
14 Corner holes
15 Support ring
16 Peripheral bead
17 Recess
18 Protrusion of the cover frame
19 Outflow channel
20 Nose
21 Stop
22 Filter chamber Having described the invention, the following is claimed:

1. A filter plate comprising:
   a basic body;
   an elastic element having radial inner and outer peripheral portions, wherein the radial inner peripheral portion defines an opening and the radial outer peripheral portion is fastened to the basic body in an annular and liquid-tight manner; and
   a temperature-control plate fastened to the radial inner peripheral portion of the elastic element, wherein the temperature-control plate is located in the opening defined by the radial inner peripheral portion,
   wherein the elastic element allows the temperature-control plate to move relative to the basic body in response to expansion and contraction of the temperature-control plate due to temperature changes.

2. The filter plate as claimed in claim 1, wherein the elastic element exerts forces to counteract changes in size of the temperature-control plate and/or of the basic element due to temperature changes.

3. The filter plate as claimed in claim 1, wherein the temperature-control plate is fastened to the elastic element in a manner such that the temperature-control plate is movable relative to the basic body in a plane generally parallel to an X-Y plane of the basic body.

4. The filter plate as claimed in claim 3, wherein the temperature-control plate is fastened to the elastic element in a liquid-tight manner and retained thereon.

5. The filter plate as claimed in claim 1, wherein the elastic element is fastened to the basic body by means of a snap connection.

6. The filter plate as claimed in claim 5, wherein the basic body has an annular fastening groove, in which the elastic element is clamped.

7. The filter plate as claimed in claim 1, wherein the elastic element is fastened to the basic body by means of a screw connection.

8. The filter plate as claimed in claim 1, wherein the elastic element is fastened to the basic body by means of a welded connection.

9. The filter plate as claimed in claim 1, wherein the temperature-control plate is comprised of a heat-conducting material.

10. The filter plate as claimed in claim 1, wherein the temperature-control plate is comprised of a metal or a heat-conducting plastic material or a combination thereof.

11. The filter plate as claimed in claim 1, wherein at least one surface of the temperature-control plate includes channels formed thereon.

12. The filter plate as claimed in claim 11, wherein the channels are formed by a wire grid arranged on the at least one surface of the temperature-control plate.

13. The filter plate as claimed in claim 11, wherein the channels are formed by profiling of the at least one surface of the temperature-control plate.

14. The filter plate as claimed in claim 1, wherein the elastic element and the temperature-control plate form a diaphragm.

15. The filter plate as claimed in claim 1, wherein the temperature-control plate is fastened to the elastic element in a liquid-tight manner and retained thereon.

16. A filter assembly comprising:
   a plurality of filter plates, wherein at least one of the filter plates includes:
      a basic body,
      an elastic element having radial inner and outer peripheral portions, wherein the radial inner peripheral portion defines an opening and the radial outer peripheral portion ion is fastened to the basic body in an annular and liquid-tight manner, and
      a temperature-control plate fastened to the radial inner peripheral portion of the elastic element, wherein the temperature-control plate is located in the opening defined by the radial inner peripheral portion,
      wherein the elastic element allows the temperature-control plate to move relative to the basic body in response to expansion and contraction of the temperature-control plate due to temperature changes;
   a filter chamber being formed on one side of a unit formed from the elastic element and the temperature-control plate; and a temperature-control device for temperature-controlling the temperature-control plate.

17. The filter assembly as claimed in claim 16, wherein the temperature-control plate is fastened to the elastic element in a manner such that the temperature-control plate is movable relative to the basic body in a plane generally parallel to an X-Y plane of the basic body.

18. The filter assembly as claimed in claim 16, wherein the temperature-control plate is subjected to a temperature-control medium from the other side, remote from the filter chamber, of the unit formed from the elastic element and the filter plate.

19. The filter assembly as claimed in claim 16, wherein the temperature-control plate has temperature-control channels, through which a temperature-control medium is passed.

20. The filter assembly as claimed in claim 16, wherein the temperature-control plate is fastened to the elastic element in a liquid-tight manner and retained thereon.

21. The filter assembly as claimed in claim 16, wherein the temperature-control plate is electrically heatable.

\* \* \* \* \*